United States Patent
Muckle et al.

[11] Patent Number: 6,051,088
[45] Date of Patent: Apr. 18, 2000

[54] LINING A PIPE

[75] Inventors: Derek Muckle, Long Whatton; Zahid Shah, Loughborough, both of United Kingdom

[73] Assignee: BG plc, Reading, United Kingdom

[21] Appl. No.: 09/147,499

[22] PCT Filed: Jul. 10, 1997

[86] PCT No.: PCT/GB97/01867

§ 371 Date: Apr. 16, 1999

§ 102(e) Date: Apr. 16, 1999

[87] PCT Pub. No.: WO98/02293

PCT Pub. Date: Jan. 22, 1998

[30] Foreign Application Priority Data

Jul. 11, 1996 [GB] United Kingdom .................. 9614622

[51] Int. Cl.⁷ ............................................. B32B 31/26
[52] U.S. Cl. ........................ 156/82; 156/287; 156/294; 264/267
[58] Field of Search .................. 156/82, 285, 287, 156/293, 294, 497; 264/267

[56] References Cited

U.S. PATENT DOCUMENTS 4,738,742   4/1988  Shishkin et al. ........................ 156/391
5,368,669  11/1994  Maine et al. ............................ 156/158

FOREIGN PATENT DOCUMENTS

| | | |
|---|---|---|
| 3904525 | 8/1990 | Germany . |
| 54-150482 | 11/1979 | Japan . |
| 4-272827 | 9/1992 | Japan . |
| 2084686 | 4/1982 | United Kingdom . |
| 2181208 | 4/1987 | United Kingdom . |
| 2264765 | 9/1993 | United Kingdom . |
| 9618493 | 6/1996 | WIPO . |

*Primary Examiner*—James Sells
*Attorney, Agent, or Firm*—Oblon, Spivak, McClelland, Maier & Neustadt, P.C.

[57] ABSTRACT

Method of lining a pipe. An outer pipe of ferrous metal is lined with a lining pipe of crosslinked polyethylene which is initially provided as a precursor lining pipe. The precursor lining pipe is initially made of cross-linked polyethylene with an external diameter equal to the internal diameter of the outer pipe. The initial pipe is then drawn through a die to form a pipe with a smaller diameter. The material of the pipe is memory material so that when it is melted it automatically expands to the original size. The precursor pipe is inserted into the outer pipe and melted by drawing a burner through it. The burner burns fuel gas supplied with combustion air through a hose by which the burner is towed. Hot products of combustion melt the polyethylene causing the precursor lining to expand automatically into the lining pipe. This is supported by gas pressure of a desired value inside the lining pipe until the polyethylene solidifies on cooling. The gas pressure is derived from the pressure of the gaseous products of combustion which may be augmented by additional air supplied to the interior of the precursor lining pipe.

20 Claims, 4 Drawing Sheets

LINING A PIPE

BACKGROUND OF THE INVENTION

1. Field of the Invention

This invention relates to a method of lining an outer pipe with a lining pipe of plastics material.

2. Discussion of the Background

It is known to line cast iron and steel pipes, for example gas distribution mains, with polyethylene lining pipe pulled through the outer pipe. The lining pipe may have a reduced diameter by pulling the lining pipe through a die immediately before it enters the outer pipe. Thereafter the lining pipe resiles back to its original size to closely line the outer pipe. The reduced diameter of the lining pipe may not be much less than the internal diameter of the outer pipe and thus internal obstructions in the outer pipe, for example joints and service pipe sockets, have to be removed to allow the lining pipe to slip through the outer pipe.

SUMMARY OF THE INVENTION

An object of the invention is to provide a method of lining an outer pipe with plastics material which can be a relatively close fit against an inner face of the outer pipe and which method does not necessarily require internal projections or obstructions within the outer pipe to be removed prior to lining, and can allow the outer pipe to be lined at relatively tight bends therein.

According to the invention a method of lining an outer pipe with a lining pipe of plastics material comprises providing a precursor lining pipe, said precursor lining pipe being produced by a procedure comprising forming an initial pipe of plastics material having a first external diameter and deforming the initial pipe to reduce its first external diameter to a second external diameter which is smaller than said first external diameter whereby the precursor lining pipe has said second external diameter and the plastics material forming the precursor lining pipe is memory plastics material having a memory of said first external diameter so that if the memory plastics material is subsequently melted by the application of heat thereto and the molten plastics material is suitably supported the precursor lining pipe will expand in accordance with its memory to increase the external diameter of the lining pipe automatically to a value substantially equal to said first external diameter, inserting said precursor lining pipe into said outer pipe, providing fluid fuel burner means inside the precursor lining pipe and applying sufficient heat to the plastics material derived from burning the fuel using the burner means to melt the memory plastics material so that the external diameter of the lining pipe expands automatically in accordance with said memory to a value substantially equal to or at least more closely approaching an internal diameter of the outer pipe than the value of said second external diameter and simultaneously supporting the molten plastics material forming the expanding and expanded lining pipe by gas pressure inside the lining pipe, said gas pressure being created at least in part by gaseous products of combustion emitted from the burner means, and on said molten plastics material cooling to a self-supporting state the lining pipe remaining in an expanded state relative to said second external diameter.

The plastics material may be a cross-linked polyethylene.

The first external diameter of the initial pipe may be substantially equal to the internal diameter of the outer pipe. In order that the precursor lining pipe can be easily passed through the outer pipe, and avoid the need for removal of internal projections or obstructions from the outer pipe, and fit round bends, the external diameter of the precursor lining pipe can be appropriately less than the internal diameter of the outer pipe.

BRIEF DESCRIPTION OF THE DRAWINGS

The invention will now be further described, by way of example, with reference to the accompanying drawings in which.

DETAILED DESCRIPTION OF THE PREFERRED EMBODIMENTS

Figure 1:
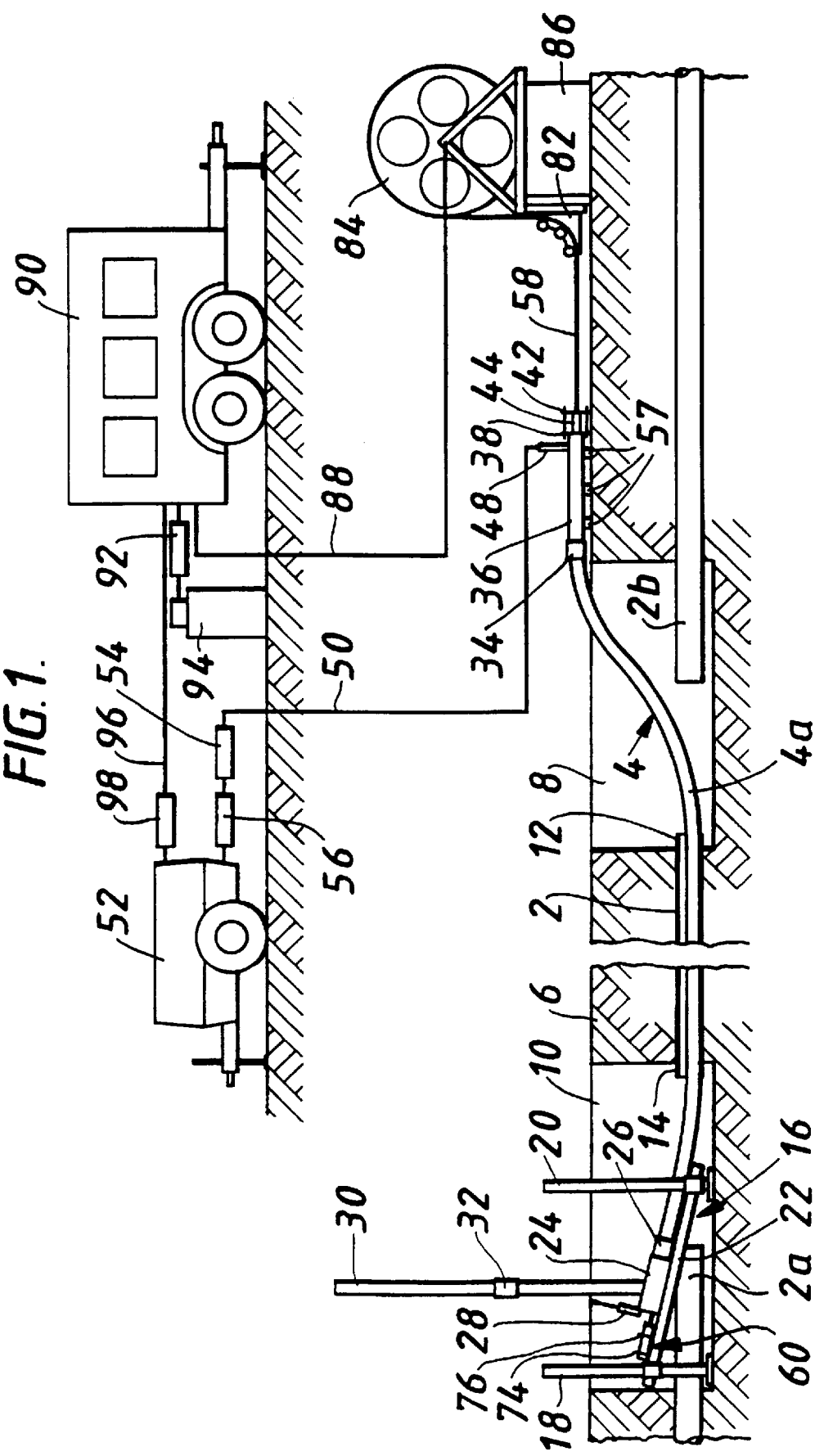
FIG. 1 is a diagramatic representation, partly in section, of apparatus used to carry out the invention, shown with a precursor lining pipe in place within an outer pipe and burner means ready to be drawn through the precursor lining pipe.

In the drawings like references identify like or similar parts.

With reference to the drawings, an outer pipe 2 to be lined may be of ferrous metal, for example cast-iron or steel, and may be for carrying gases or liquids, for example a gas main or a water main.

Reference 4 indicates generally a pipe of plastics material whether the pipe is in the form of a precursor lining pipe 4a or the precursor has been expanded to form a lining pipe 4b to permanently line the outer pipe 2.

The precursor lining pipe 4a is manufactured by first forming an initial pipe of the plastics material, this initial pipe having a solid wall and having a first or initial external diameter substantially equal to the internal diameter of the outer pipe 2. The initial pipe is mechanically deformed to reduce its external diameter to a second external diameter which is less than said initial external diameter. This is done by pulling the initial pipe through a calibrated die and has the effect of also thickening the pipe wall. Thus the resultant precursor lining pipe 4a has a smaller external diameter than that of the initial pipe but with a thicker wall. The plastics material forming the precursor lining pipe 4a is memory plastics material in that it has a memory of said initial external diameter. When the plastics material forming the precursor lining pipe 4a is melted by application of heat the precursor lining pipe 4a expands automatically (provided the molten wall of the pipe is suitably supported internally to avoid sagging or collapse of the wall) to attain an external diameter substantially equal to said initial external diameter. Which external diameter size the expanded pipe substantially retains, subject to some reduction in size caused by contraction due to cooling when the expanded pipe cools so that pipe wall temperature falls below the melt temperature and the wall becomes solid and self-supporting. A suitable plastics material to form the precursor lining pipe 4a is cross-linked polyethylene which may have a melt temperature of substantially 137° C. Precursor lining pipes 4a of cross-linked polyethylene may be obtained from Uponor N.V. of The Netherlands.

Figure 2:
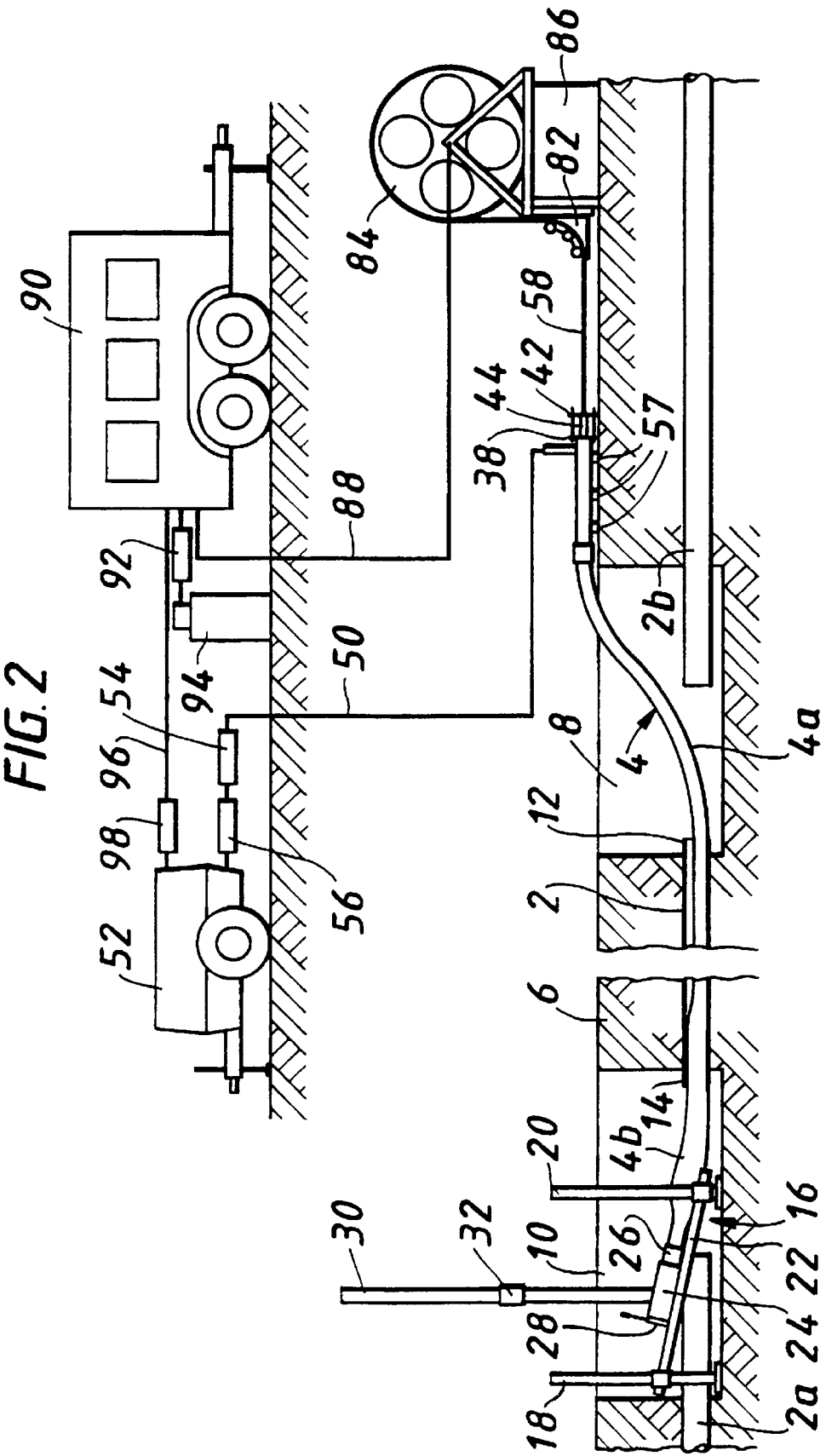
FIG. 2 shows the apparatus in FIG. 1 during the course of moving the burner means giving off heat to expand the precursor lining pipe to form a lining pipe lining the outer pipe.

With reference to FIGS. 1 and 2, an underground pipe is shown buried in ground 6, a section of the pipe to be lined being the outer pipe 2 having access pits or shafts 8 and 10 dug into the ground at opposite ends 12, 14 of that outer pipe which ends are separated (by removal of pipe portions) from remaining underground pipe sections 2a and 2b.

With reference to FIG. 1, a length of the precursor lining pipe 4a is inserted through the outer pipe 2. The external diameter of the precursor lining pipe 4a may be about three-quarters of the internal diameter of the outer pipe 2, for example if the pipe 2 has an internal diameter of substantially 100 mm the external diameter of the precursor lining pipe 4a may be substantially 75 mm. A supporting frame 16 is mounted in the pit 10 and has legs 18, 20 on which a support 22, which may be of substantially semi-circular channel section, is mounted. Mounted on the support 22 is a chamber or tube 24, which may be of metal, having at one end an hollow connector 26 mounted thereon in fluid-tight manner, and an end of the precursor lining pipe 4a is detachably attached in a fluid-tight manner to the connector. At its opposite end the tube 24 has an access opening which may be opened as indicated in FIG. 1 by manually lifting a closure gate 28 and can be closed in a fluid tight manner by manually closing the closure gate 28 as indicated in FIG. 2.

An outlet pipe or ventilation stack 30 ascends vertically out of the pit 10 from the tube 24 into which the stack opens. The stack 30 includes a one-way pressure relief valve 32 which may be adjustably variable so that the pressure at which the valve opens to relieve pressure in the tube 24 may be selectively varied.

Figure 4:
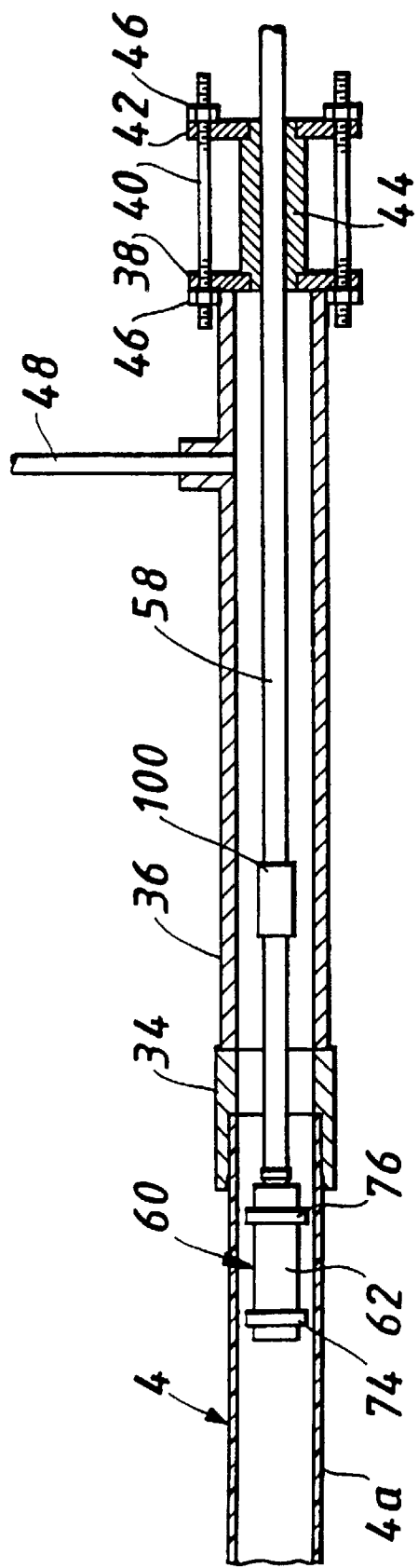
FIG. 4 is a diagramatic view, partly in section, of an arrangement at one end of the lining pipe, to which end the burner means travels during the course of heating the precursor lining pipe to cause its expansion to form the lining pipe.

With particular reference to FIGS. 1, 2 and 4 an end of the precursor lining pipe 4a emerging from the pit 8 is detachably connected in a fluid-tight manner to connector 34 mounted in a fluid-tight manner at an end of a retrieval chamber or tube 36 which may be metal. At the other end of retrieval tube 36 is mounted a flange 38 in fluid-tight manner. The flange 38 carries tie-bolts 40 attaching an annular plate 42 to the flange. A cylindrical seal or gland 44 of elastomeric material is held between the flange 38 and plate 40 and has an axial passage having an internal diameter which can be decreased by increasing compression of the gland between the flange and plate using nuts 46 the tie-bolts 40. A pipe 48 for supplying pressurised air into the interior of the retrieval tube 36 is connected by an air-line 50 to an air-compressor 52 provided as a towable trailer vehicle, said air-line including a manual on/off valve 54 and a pressure regulator 56 by which the air is supplied to the retrieval tube 36 at a desired selectively variable pressure. The retrieval tube 36 sits on the ground on a support frame comprising frame members 57.

With reference to FIG. 4, a flexible hose 58 is a sliding fit through the gland 44 which provides a relatively fluid-tight seal against the hose which may have an armoured cover or sheath formed of wire braid. At one end the hose 58 is attached to a gas burner 60 comprising a cylindrical housing 62, which may be of stainless steel, containing a burner nozzle unit 64, which may be of the retain-a-flame type, having a main central nozzle 66 from which a main gas flame 68 issues surrounded by smaller nozzles 70 from which issue flamelets 72 for stabilising and retaining the main flame which at all times is arranged to remain within the housing 62. Housing 62 is surrounded, adjacent to each end, by two metal support rings 74 and 76 each mounted in position by at least three pointed grub screws 78 to ensure an annular gap 80 between each support ring and the housing to keep to a minimum heat transfer from the housing to the support rings which thus remain relatively cool.

As shown in FIGS. 1 and 2, remote from the burner 60, the hose 58 beyond the gland 44 slidably passes through a guide 82 and is then wound in a single layer on a winch cylinder 84 on a support frame 86.

The winch cylinder 84 may be motor driven. Because the hose 58 is wound on the cylinder 84 in a single layer, then for any particular speed of rotation of the cylinder, the hose is wound thereon at a substantially constant linear velocity corresponding to the particular cylinder speed. The hose 58 may be at least 100 m in length. Remote from the burner 60, the end of the hose 58 is connected at the winch cylinder 84 with a rotary connector supplying a mixture of fuel gas and combustion air in desired proportions to the hose for supply to the burner. This rotary connector is supplied with the fuel gas/combustion air mixture by a line 88 from a control unit 90 in the form of a towable trailer vehicle. The fuel gas, which may be propane, is supplied to control unit 90 via a gas pressure regulator 92 from a gas storage cylinder 94, and the combustion air for mixing with the fuel gas is supplied to the control unit from the air compressor 52 via a line 96 including an air pressure regulator 98.

Figure 3:
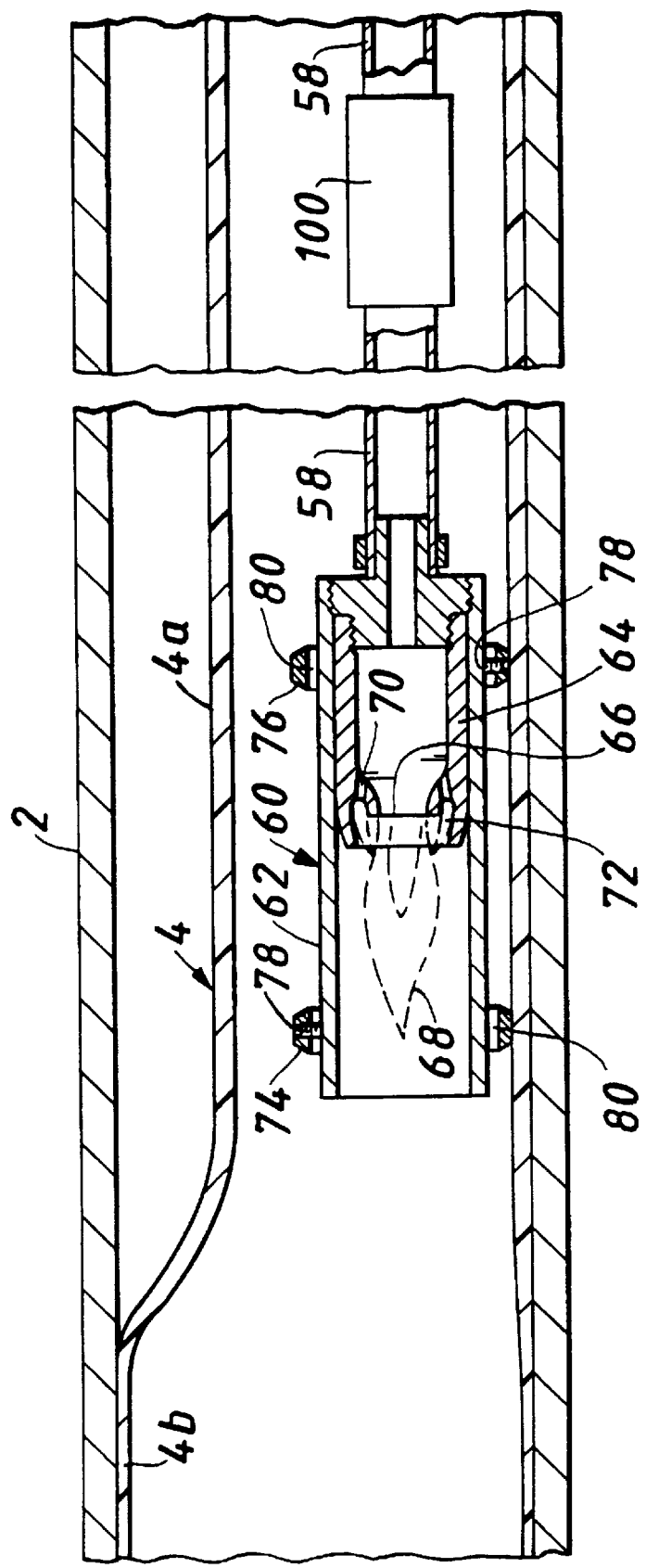
FIG. 3 is a diagramatic view, partly in section, of a fragment of an outer pipe being lined by the method according to the invention.

As shown in FIGS. 3 and 4, the hose 58 includes a flame trap 100 adjacent to the burner 60 to prevent passage of any flame from the burner along the hose towards the winch cylinder 84 (FIGS. 1 and 2).

If desired the burner 60 (FIGS. 3 and 4) may include a flame monitor (not shown), for example a thermocouple, which can observe when the flame goes out inadvertently so the monitor can send a signal to the control unit 90 (FIGS. 1 and 2) which can initiate an emergency shut down, for example stopping supply of fuel gas to the burner and/or halting rotation of the winch cylinder 84. Supply of fuel gas may also be stopped automatically by the control unit 90 if the winch cylinder 84 is detected in a stalled state by stall detector means (not shown). Also the control unit 90 is arranged to control the speed of rotation of the winch cylinder 84 to a desire selected speed within a range of possible speeds.

The hose 58 is paid out from the winch cylinder 84 and the hose and burner 60 are passed along the precursor lining tube 4a from the retrieval tube 36 until the burner reaches the tube 24 and then emerges therefrom through the access opening uncovered by the lifted closure gate 28 (FIG. 1) for the burner to rest on the support 22. The fuel gas/combustion air supply to the hose 58 is turned on and the gas is ignited at the burner 60. Now the winch cylinder 84 winds in a little of the hose 58 to draw the ignited burner 60 into the tube 24 and then the access opening to the tube is closed by lowering the closure gate 28 (FIG. 2).

With particular reference to FIGS. 1 and 2, the winch continues to be operated to wind in more hose 58 to pull the lit burner 60, emitting gaseous products of combustion, through the precursor lining pipe 4a. The gas pressure inside the pipe 4 may reach, fairly quickly, substantially a desired high enough pressure (above atmospheric pressure) as set by th the relief valve 32, for example in the range of substantially 250 to substantially 300 mbarg. The heat output from the burner 60 may be, for example, substantially 28 kW. The burner 60 may move at a substantially constant speed, for example substantially 75 m per hour. The heat applied to the precursor lining pipe 4a has a temperature greater than the melt temperature of the plastics material forming the precursor lining pipe. As a result as the burner 6 progresses along the precursor lining pipe 4b the pipe wall melts and it expands radially automatically in accordance with the memory of the plastics material and under the support provided by the gas pressure inside the pipe 4. This is exemplified in FIG. 3 where it may be seen that as a result of the radial expansion of the precursor lining pipe 4a into the lining pipe 4b the latter has a thinner resultant wall than the precursor lining pipe, and the lining pipe with melted wall is making substantially full area contact with the inner face of the outer pipe 2. As the burner 60 moves further along the pipe 4, the portions of melted lining pipe 4b more remote from the burner cool and solidify and the lining pipe thereat becomes fully self-supporting. However due to this cooling, the lining pipe 4b may contract a little so that its external diameter is less than the internal diameter of the outer pipe 2. Eventually the burner 60 has moved fully through the pipe 4 to turn it into lining pipe 4b for the outer pipe 2 and reaches the retrieval tube 36 in which the burner comes to rest by the winch cylinder 84 being stopped. If desired the flame may be extinguished by cutting off the fuel supply when the burner has passed out of the outer pipe 2 at the end 12 (FIGS. 1 and 2).

The temperature of the gas flame 68 (FIG. 3) may be about 900° C. to 1000° C. Thus the products of combustion are very hot and there is risk of charring the plastics material internally of the lining pipe 4b if the elevated gas pressure inside the pipe 4 is entirely due to the products of combustion output from the burner. Also there may be gas leaks from the pipe 4 at various joints in the arrangement and at the closure gate 28 and the gland 44 tending reduce the pressure inside the pipe 4. To compensate for these leaks and to reduce the risk of charring, supplementary air under pressure may be supplied to retrieval tube 36 through the pressure air line 50. This supplementary air may both cool the products of combustion and augment the pressure due thereto to maintain the gas pressure in the pipe 4 at the desired level. If the plastics material forming the precursor lining pipe 4a is cross-linked polyethylene, it has a melt temperature of substantially 137° C. The heat applied thereto may be in the temperature range of substantially 140° C. to 150° C. due to the cooling effect of the supplied supplementary air which may have a flow rate of substantially four cubic metres per hour into the retrieval tube 36.

We claim:

1. A method of lining an outer pipe with a lining pipe of plastics material comprising providing a precursor lining pipe, said precursor lining pipe being produced by a procedure comprising forming an initial pipe of plastics material having a first external diameter and deforming the initial pipe to reduce its first external diameter to a second external diameter which is smaller than said first external diameter whereby the precursor lining pipe has said second external diameter and the plastics material forming the precursor lining pipe is memory plastics material having a memory of said first external diameter so that if the memory plastics material is subsequently melted by the application of heat thereto and the molten plastics material is suitably supported the precursor lining pipe will expand in accordance with its memory to increase the external diameter of the lining pipe automatically to a value substantially equal to said first external diameter, inserting said precursor lining pipe into said outer pipe, providing fluid fuel burner means inside the precursor lining pipe and applying sufficient heat to the plastics material derived from burning the fuel using the burner means to melt the memory plastics material so that the external diameter of the lining pipe expands automatically in accordance with said memory to a value substantially equal to or at least more closely approaching an internal diameter of the outer pipe than the value of said second external diameter and simultaneously supporting the molten plastics material forming the expanding and expanded lining pipe by gas pressure inside the lining pipe, said gas pressure being created at least in part by gaseous products of combustion emitted from the burner means, and on said molten plastics material cooling to a self-supporting state the lining pipe remaining in an expanded state relative to said second external diameter.

2. A method as claimed in claim 1, in which the plastics material is cross-linked polyethylene.

3. A method as claimed in claim 1, in which the burner means is moved through said precursor lining pipe.

4. A method as claimed in claim 1 in which fluid fuel is supplied to said burner means through tube means which applies force to said burner means causing the latter to move through said precursor lining pipe.

5. A method as claimed in claim 4, in which said hose means conveys combustion air to said burner means.

6. A method as claimed in claim 1 in which the gas pressure inside the lining pipe is maintained at a substantially predetermined value.

7. A method as claimed in claim 6, in which sealing arrangements at opposite ends of the precursor lining pipe inhibit leakage of gases from the interior of the precursor lining pipe which is in communication with gas pressure relief means set to open at said predetermined value to maintain the gas pressure at substantially that predetermined value.

8. A method as claimed in claim 1 in which supplementary air is supplied to the interior of the precursor lining pipe in addition to air supplied to support combustion of the fuel at the burner means, and the gas pressure inside the lining pipe is a combination of that of the products of combustion and the pressure of the supplementary air.

9. A method as claimed in claim 8, in which the supplementary air cools the products of combustion.

10. A method as claimed in claim 1 in which the burner means comprises nozzle means within an housing, and a flame of burning fuel from said nozzle means is contained substantially entirely within said housing having an opening for issuance therefrom of the products of combustion.

11. A method as claimed in claim 2, in which the burner means is moved through said precursor lining pipe.

12. A method as claimed in claim 2, in which fluid fuel is supplied to said burner means through tube means which applies force to said burner means causing the latter to move through said precursor lining pipe.

13. A method as claimed in claim 3, in which fluid fuel is supplied to said burner means through tube means which applies force to said burner means causing the latter to move through said precursor lining pipe.

14. A method as claimed in claim 2, in which the gas pressure inside the lining pipe is maintained at a substantially predetermined value.

15. A method as claimed in claim 3, in which the gas pressure inside the lining pipe is maintained at a substantially predetermined value.

16. A method as claimed in claim 4, in which the gas pressure inside the lining pipe is maintained at a substantially predetermined value.

17. A method as claimed in claim 5, in which the gas pressure inside the lining pipe is maintained at a substantially predetermined value.

18. A method as claimed in claim 2, in which supplementary air is supplied to the interior of the precursor lining pipe in addition to air supplied to support combustion of the fuel at the burner means, and the gas pressure inside the lining pipe is a combination of that of the products of combustion and the pressure of the supplementary air.

19. A method as claimed in claim 3, in which supplementary air is supplied to the interior of the precursor lining pipe in addition to air supplied to support combustion of the fuel at the burner means, and the gas pressure inside the lining pipe is a combination of that of the products of combustion and the pressure of the supplementary air.

20. A method as claimed in claim 4, in which supplementary air is supplied to the interior of the precursor lining pipe in addition to air supplied to support combustion of the fuel at the burner means, and the gas pressure inside the lining pipe is a combination of that of the products of combustion and the pressure of the supplementary air.

* * * * *